(12) United States Patent
Roszkowski et al.

(10) Patent No.: US 6,471,183 B2
(45) Date of Patent: Oct. 29, 2002

(54) BALL VALVE

(76) Inventors: Bogdan Roszkowski, 72 Main South Road, Morphett Vale (AU), 5162; David Chelchowski, 79 Jetty Road, Largs Bay (AU), 5016

( * ) Notice: Subject to any disclaimer, the term of this patent is extended or adjusted under 35 U.S.C. 154(b) by 0 days.

(21) Appl. No.: 09/782,717

(22) Filed: Feb. 13, 2001

(65) Prior Publication Data

US 2001/0008277 A1 Jul. 19, 2001

(30) Foreign Application Priority Data

Aug. 18, 1999 (AU) .................. PCT/AU99/00666

(51) Int. Cl.[7] ................................................ F16K 5/06
(52) U.S. Cl. ............................ 251/315.16; 257/315.01
(58) Field of Search ........................ 251/315.16, 315.01

(56) References Cited

U.S. PATENT DOCUMENTS

| | | | | |
|---|---|---|---|---|
| 3,155,368 A | * | 11/1964 | Shafer | 251/315.16 |
| 3,195,857 A | * | 7/1965 | Shafer | 251/315.16 |
| 3,339,259 A | * | 9/1967 | Johnson | 251/315.16 |
| 3,501,127 A | * | 3/1970 | Freeman | 251/315.16 |
| 3,501,128 A | * | 3/1970 | Pool | 251/315.16 |
| 3,518,742 A | * | 7/1970 | Merrill et al. | 251/315.16 |
| 5,149,054 A | * | 9/1992 | Passerell et al. | 251/309 |

FOREIGN PATENT DOCUMENTS

| | | | | |
|---|---|---|---|---|
| DE | 2628645 | * | 1/1977 | 251/315.16 |
| GB | 1224602 | * | 3/1971 | 251/315.16 |

* cited by examiner

Primary Examiner—Henry C. Yuen
Assistant Examiner—John Bastianelli
(74) Attorney, Agent, or Firm—Francis Law Group

(57) ABSTRACT

The present invention relates to a valve member for a valve of the ball valve type, including two shell parts rigidly joined together to form a valve member and generally snap-fitted over a frame. The two shells have opposed sealing surfaces and a flow passage extends through the shells and the frame. The valve member includes a means for engagement of a drive mechanism to enable rotation of the valve assembly, wherein said valve member can be rotated to present a sealing surface or alternatively rotated to present a flow path to a water supply when said valve member is located in a sealed fluid passage such as a pipe.

5 Claims, 4 Drawing Sheets

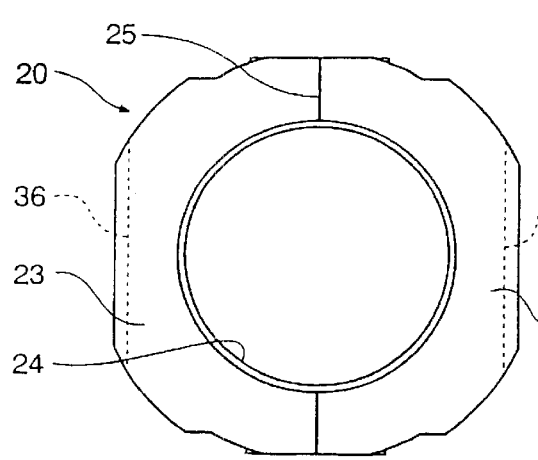
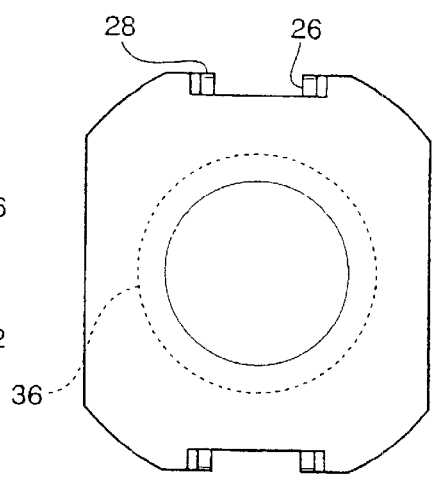
FIG 2a  FIG 2b
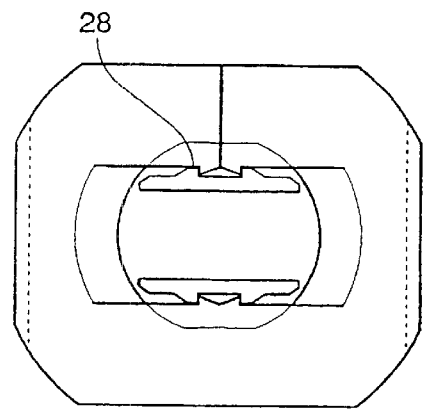
FIG 2c
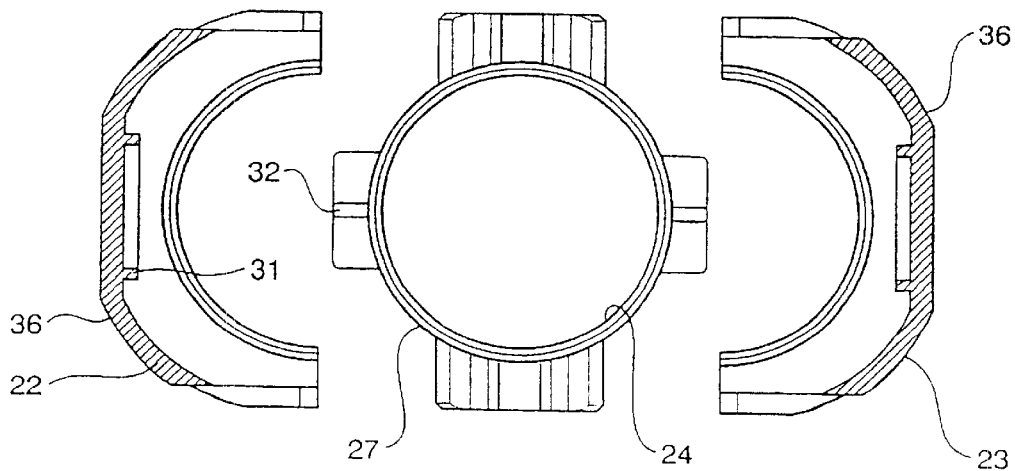
FIG 2d

BALL VALVE

FIELD OF THE INVENTION

The present invention relates generally to fluid control devices. More particulary, the invention relates to a valve member for a valve of the ball valve type.

BACKGROUND OF THE INVENTION

Ball valves manufactured from plastic material are known. These valves incorporate a rotatable plastic ball adapted to close off a thoroughbore. The ball has a central hole or aperture roughly equal to the thoroughbore of the valve. The ball is encapsulated between valve seats which comprise two ring seals mounted inside a valve body. The external surface of the ball has a part spherical shape around the area in contact with the seals. The spherical surface of the ball must not have any distortions and requires a high quality surface finish in order to achieve proper sealing.

In conventional plastic ball valves the ball is of a single configuration that is injection moulded. After moulding, the ball requires machining since it is virtually impossible to obtain a spherical shape of the external surface in the injection molding process. Frequently, there is an additional operation required to improve the surface finish of the external surface of the ball. Plastics used to produce the ball are often very expensive, because they must fulfil strict requirements of high wear resistance and low coefficient of friction. As a result the process of producing a plastic ball is inefficient and costly.

It is therefore an object of the invention to provide a new and improved ball or valve member for a valve of the ball valve type that has reduced manufacturing cost.

SUMMARY OF THE INVENTION

In accordance with the above objects and those that will be mentioned and will become apparent below, the ball valve member in accordance with this invention comprises a frame member having at least first and second sides and a flow passage therethrough, the frame member including a first set of attachment members disposed on the first side and a second set of attachment members disposed on the second side, at least first and second shells, the first shell including first engagement means adapted to engage the first set of attachment members, the second shell including second engagement means adapted to engage the second set of attachment members, a first sealing surface disposed on at least the first shell, and drive mechanism means adapted to engage the drive mechanism of a fluid control device to enable rotation of the ball valve in the fluid control device.

An advantage of this invention is that a ball valve member is made from only three components parts; two of which are identical. This makes the manufacture and assembly of the valve member relatively simple and inexpensive. Furthermore, each of the component parts can be replaced when damaged, instead of replacement of the whole unit as in the prior art devices.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIGS. 2a–2d are plan views of one embodiment of the valve member according to the invention;

FIG. 2c is an exploded plan view of the valve member shown in FIGS. 2a–2d;

FIG. 3b is an exploded, perspective view of the valve member shown in FIG. 3a.

DETAILED DESCRIPTION OF THE PREFERRED EMBODIMENT

Figure 1:
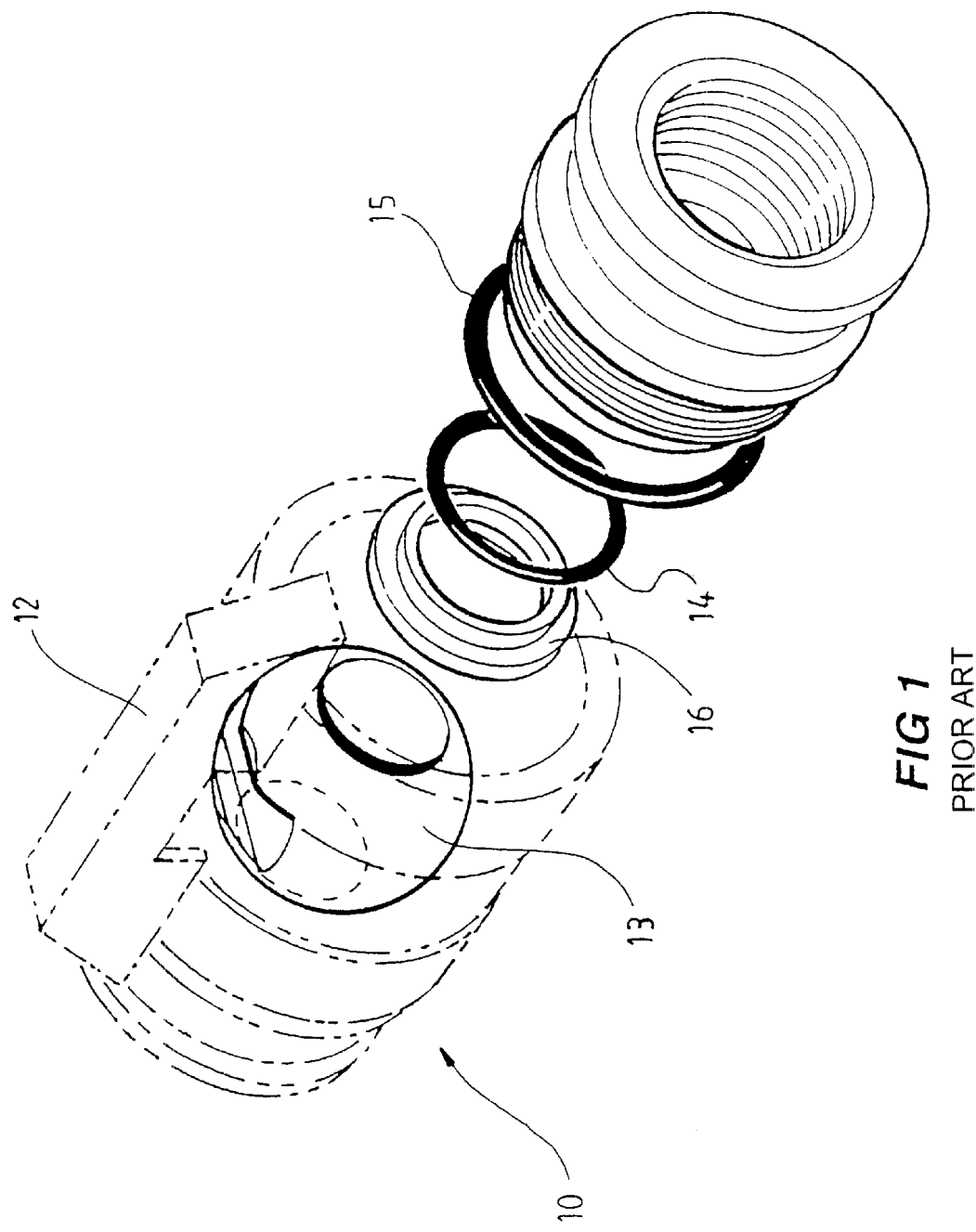
FIG. 1 is a perspective view of a prior art ball valve assembly.

Turning now to the drawings in detail, there is shown in FIG. 1 a ball valve assembly with a prior art ball. The ball valve assembly 10 has a handle 12 to rotate the ball 13 by means of slot, O rings 14, 15 and a ball seat 16. It shows the prior art ball 13 comprised of a single piece construction. The drawback of this apparatus is mostly one of cost. The ball itself is costly and time consuming to manufacture. It is molded as a single configuration and after molding requires machining to obtain the correct shape. Often a further finishing operation is required to improve the surface finish of the external surface of the ball.

These difficulties are overcome in the ball for a ball valve member of the present invention. Referring to FIG. 2a, there is shown an assembled form of the valve member 20 in side view, with preferably identical parts 22 and 23 joined together at 25 to form the valve member 20. The dotted line depicts sealing surfaces 36 upon which a valve seat of a valve assembly sits. These sealing surfaces are circular and one is formed on each of the two parts 22 and 23, see also FIG. 2b.

Bore 24 provides a flow passage through the valve member 20. Drive transfer mechanism 26 enables the handle of the valve assembly (shown in FIG. 1) to engage the valve member 20 for rotational movement. Inter-engaging locking means 28 are provided on at least two opposing sides of a frame 27 to engage the respective parts of the valve member 20 in preferably a snap fit arrangement. Inter-engaging locking means 28 are also used to rotatably drive the ball.

FIG. 2c shows in greater detail the inter-engaging locking means 28 which enables the two parts 22 and 23 of the valve member 20 to be snap fit. The handle (not shown) is then able to lock into position and engage drive mechanism 26 to rotate the valve member 20 from an open to a closed position when positioned in a pipe (not shown). Once in the open position a flow passage is established with alignment of the bore 24 and the pipe thereby enabling fluid (such as water) to flow. In the closed position, the flow passage is not established as the sealing surfaces are rotated to align with the pipe and thereby shut off any passage of fluid.

Turning now to FIG. 2d, there is shown the components of the valve member 20 in detail. The two parts 22, 23 are preferably identical and spherical in shape, forming two spherical shells. Since the parts 22, 23 are identical, they can be manufactured from the one die that simplfies the manufacturing and assembly process. Each part 22, 23 includes a sealing surface 36 (see FIGS. 2a–2c) that are preferably located on opposed sides of the valve member 20 and seal against the valve seat assembly when in use. The frame 27 includes bore 24 which provides a flow passage from one side of the valve member 20 to another side, and such that engagement of the drive mechanism with the handle 12 enables rotation of the valve member 20 to present a pair of sealing surfaces or alternatively flow surfaces to a fluid supply.

Figure 3A:
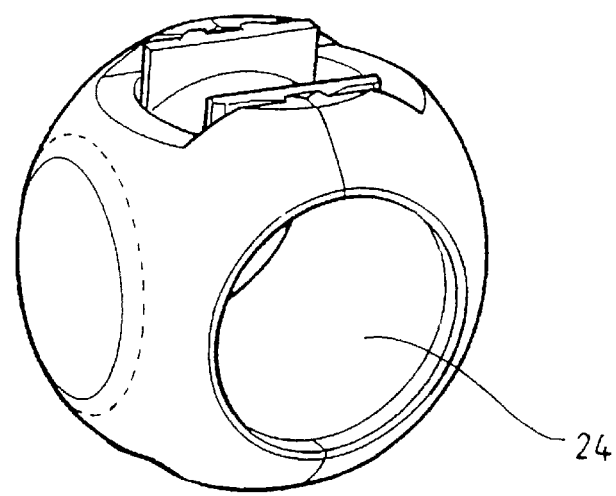
FIG. 3a is a perspective view of an assembled valve member according to the invention.

Encapsulation of the frame 27 by the ball valve parts 22, 23 is shown in FIG. 3*a*, whereby alignment of the two parts 22, 23 ensures establishment of a throughbore to allow for the passage of fluid when the valve member 20 is used in conjunction with the ball valve. It is however to be understood that the frame 27 does not need to be wholly encapsulated by the parts (or shells) 22, 23. At times it may be advantageous to have the parts 22, 23 engage said frame 27 without having to encapsulate it.

Figure 3B:
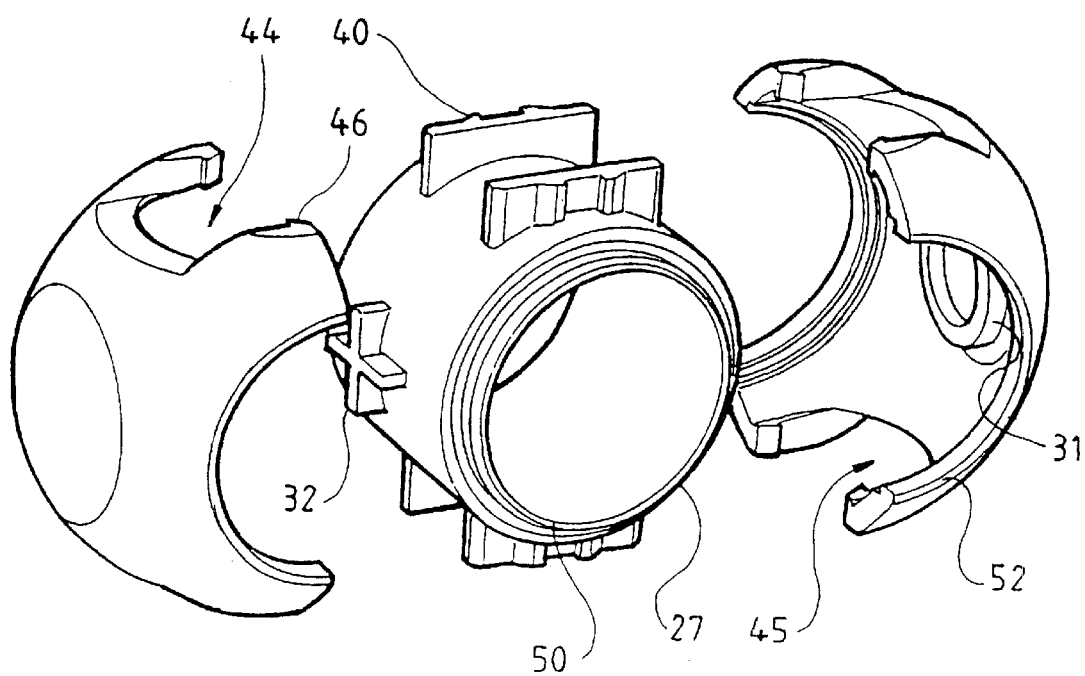

Greater detail of the valve member components is shown in FIG. 3*b*, in which the frame 27 includes a set of flanges 40 provided on opposing sides of the frame 27, which include engagement means that function to receive corresponding sections of the parts 22, 23, including hook means 46 on the parts 22, 23, to effect encapsulation of the frame 27 by the two spherical parts 22, 23. Projection means 32 are located on opposing sides of the frame 27 for positive location of each part 22, 23 with respect to the frame 27 and are shown as X type structures protruding from opposing faces of the frame 27. The projection means 32 may however be of any configuration sufficient to achieve the necessary location and drive of the frame to the spherical parts 22, 23.

Recess 31 disposed on each part 22, 23 engage with projections 32 on the frame 27 to enable transfer of rotational forces from the frame 27 to the parts 22, 23.

The spherical parts 22, 23 each have cutouts 44 and 45, said cutouts being semicircular in shape. The parts 22, 23 also include hook means 26 at the periphery of at least two opposing cutouts 44 whereby the hook means 26 engage with engagement means of the flange of the frame 27 in a snap fit action.

In addition, the frame 27 includes a ridge 50 extending the full circumference of the frame edge. The ridges 50 engage with corresponding grooves 52 in each of the two spherical parts 22, 23 to thereby enhance and strengthen the joining of the components of the valve member 20. The frame 27 is thereby able to be encapsulate by the snap fit action of the two spherical parts 22, 23 to form a valve member for a valve of the ball valve type.

All components of the valve member 20 can be injection molded to provide an economic alternative to the prior art.

Figure 4A:
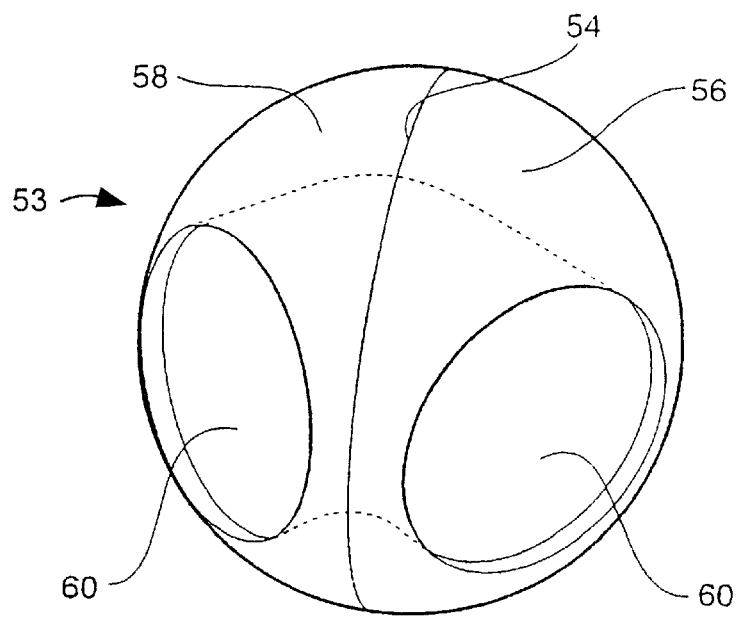
FIGS. 4a and 4b are perspective views of a further embodiment of the invention.
Figure 4B:
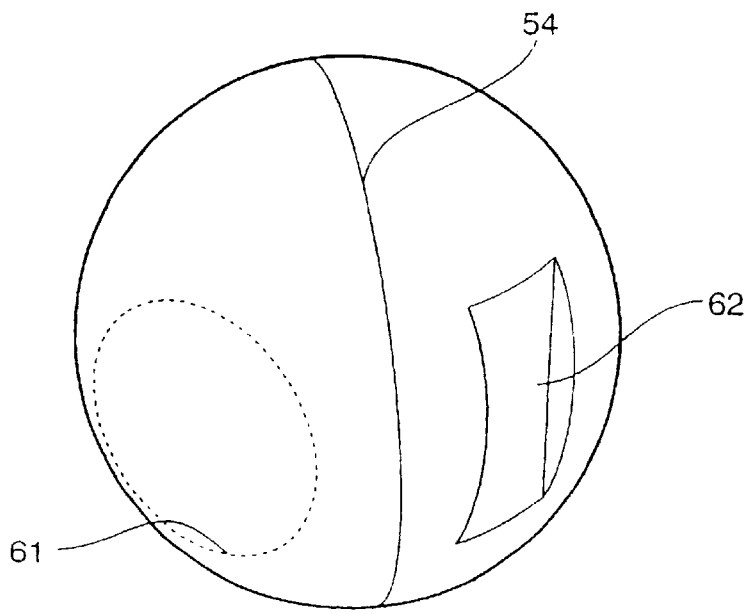

Another embodiment of the invention is illustrated in FIGS. 4*a* and 4*b*. These figures depict a configuration of a valve member according to the invention wherein a ball 53 is formed from shells 56 and 58 and the throughbore 60 in the frame is at approximately 90 degrees, forming a corner valve. It may be noted that the valve seat of the ball valve assembly which engages the sealing surface 61 does not cover the joint 54 of the two spherical shells 56, 58, as the joint 54 would prevent the seal between the valve seat and the valve member. The drive mechanism can engage into slot 62 in the ball assembly.

This ball valve assembly of the present invention can also be applied with a throughbore having more than two apertures.

The foregoing descriptions of specific embodiments of the present invention have been presented for the purposes of illustration and description. They are not intended to be exhaustive or to limit the invention to the precise forms disclosed. Without departing from the spirit and scope of this invention, one of ordinary skill can make various changes and modifications to the invention to adapt it to various forms of usage and conditions. As such, these changes and modifications are properly, equitably, and intended to be, within the full range of equivalence of the following claims.

What is claimed is:

1. A valve member for a fluid control device, said device including a drive mechanism, comprising:

a frame member having at least first and second sides and a flow passage therethrough, said frame member including a first set of attachment members disposed on said first side and a second set of attachment members disposed on said second side;

at least first and second shells, said first and second shells having a substantially hemispherical shape, said first shell including first engagement means adapted to engage said first set of attachment members, said second shell including second engagement means adapted to engage said second set of attachment members, said first and second shells being adapted to substantially encapsulate said frame member when said first engagement means engages said first set of attachment members and said second engagement means engages said second set of attachment members;

a first sealing surface disposed on at least said first shell; and drive engagement means adapted to engage said drive mechanism to enable rotation of said valve member in said fluid control device.

2. The valve member of claim 1, wherein said first and second shells are substantially similar.

3. The valve member of claim 1, wherein said frame includes first projection means for positioning said first shell and second projection means for positioning said second shell.

4. The valve member of claim 3, wherein said first shell includes third engagement means for engaging said first projection means and said second shell includes fourth engagement means for engaging said second projection means, whereby when said first projection means is engaged by said third engagement means and said second projection means is engaged by said fourth engagement means rotational forces applied to said frame are substantially transferred to said first and second shells.

5. The valve member of claim 1, wherein said valve member includes a second sealing surface disposed on said second shell, said first and second sealing surfaces being disposed on substantially parallel planes.

* * * * *